K. W. O. SCHWEDER.
SAFETY MECHANISM FOR MINE CAGES AND THE LIKE.
APPLICATION FILED APR. 2, 1907.
902,690.
Patented Nov. 3, 1908.
3 SHEETS—SHEET 1.
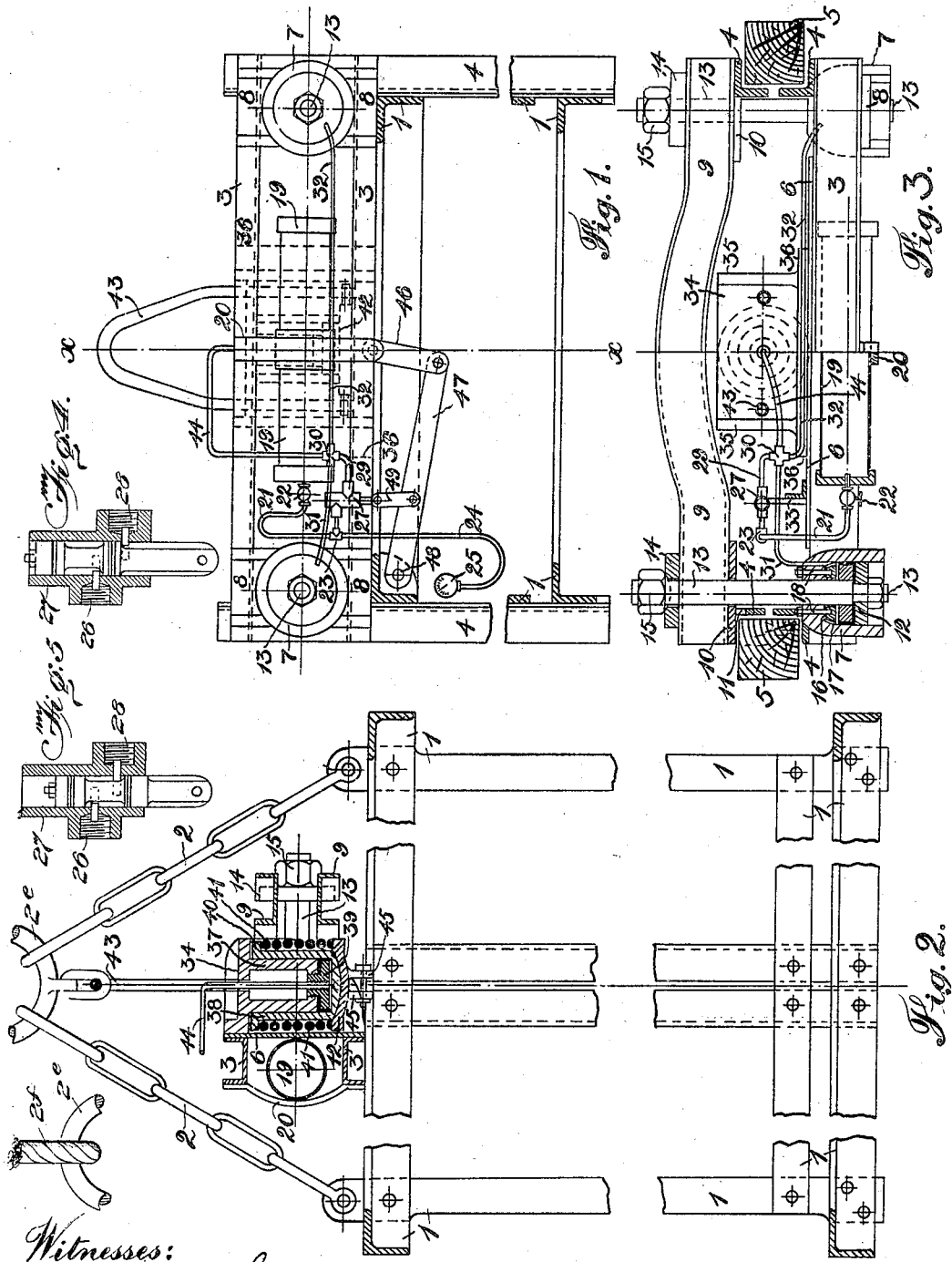

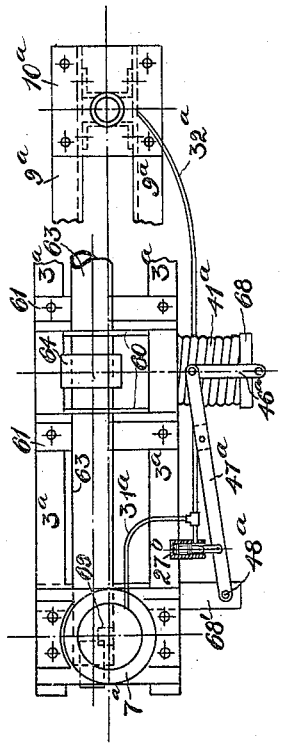

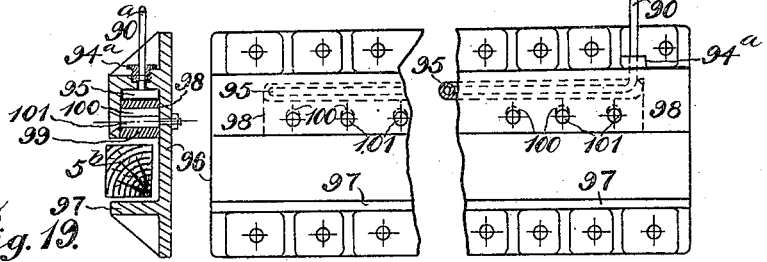

UNITED STATES PATENT OFFICE.

KURT WILHELM OTTO SCHWEDER, OF JOHANNESBURG, TRANSVAAL.

SAFETY MECHANISM FOR MINE-CAGES AND THE LIKE.

No. 902,690.

Specification of Letters Patent.

Patented Nov. 3, 1908.

Application filed April 2, 1907. Serial No. 366,055.

*To all whom it may concern:*

Be it known that I, KURT WILHELM OTTO SCHWEDER, a subject of the German Emperor, and resident of Johannesburg, Transvaal, have invented certain new and useful Improvements in Safety Mechanism for Mine-Cages and the Like, of which the following is a specification.

This invention relates to safety devices or arrangements primarily designed for the cages, skips, or other vehicles employed for hoisting purposes in mine shafts and the like. It may be also utilized for the same purpose on cars or other vehicles employed in elevators, lifts, hoists or other hoisting apparatus, in which the vehicle is guided by guides, runners, or skids, in the way or well of the hoist, etc.

The invention is designed to utilize compressed gas, such for example as liquid carbonic acid, for operating the frictional brake or safety devices to retard and ultimately arrest the movement of the cage or vehicle in the event of breakage of the hoisting rope, or other part of the suspension gear.

As compared with safety devices heretofore designed for the purpose above mentioned, a device constructed in accordance with my invention possesses, among others, the following advantages. The parts which are operated or moved by the actuating spring to bring the safety catch into action are comparatively light: the device acts without jerk or shock and can be adapted to wood as well as to steel or other metal guides; unevenness or inequalities in the surfaces of the guides or runners, arising from wear or other cause do not render the device inoperative, as the stroke or travel of the pistons directly operating the friction brakes are capable of any requisite adjustment; the device can, with facility, be made operative or inoperative by means of a stop valve, which under certain circumstances it is desirable to provide for, as for example in collieries where it is desirable to employ the safety catches only when men are being raised or lowered; as the gas pressure which serves for actuating the brake mechanism is high, and the force exerted thereby is applied in straight lines, the parts need only be of light construction; the means requisite for storing the necessary force can be light in weight as only a few pounds of the carbonic acid or other compressed gas will be required for operating the device say twelve times; in the event of breakage of the hauling rope, the falling broken end of the rope, after being drawn down by the main spring, is further accelerated or drawn down to the cage and retained there by means preferably actuated by the gas pressure; the device may be so designed that once it has come into operation only the maximum load the hoisting rope is capable of withstanding, will be able to free it; it allows provision to be made for the inmates of the cage to bring the safety device into operation, so that they may use it as a brake.

The invention will now be fully described by aid of the accompanying illustrative drawings, wherein Figure 1 is a sectional elevation of the frame of the cage or vehicle also illustrating the safety arrangement in side elevation. Fig. 2 is a sectional elevation of Fig. 1 on a plane represented by the line $x$—$x$, with certain parts removed. Fig. 3 is a part sectional plan, with the frame removed. Fig. 4 is a sectional elevation of the main valve in its closed position. Fig. 5 is a similar view of the valve in its open position. Fig. 6 is an elevation with certain parts broken away, illustrating a modification of the invention. Fig. 7 is a part sectional plan of Fig. 6 with certain parts removed. Fig. 8 is a transverse section of Fig. 7, on the plane $x^1$—$x^1$. Fig. 9 is a cross section of Fig. 7 on the plane $y$—$y$. Fig. 10 is a side elevation illustrating a further modification. Fig. 11 is a section of Fig. 10 on the plane $y^1$—$y^1$. Fig. 12 is a sectional plan illustrating a modification in the arrangement of one of the working cylinders and its piston. Fig. 13 is a sectional elevation of Fig. 12. Fig. 14 is a sectional elevation of the main valve showing the combination therewith of an auxiliary valve. Fig. 15 is an end elevation of Fig. 14. Fig. 16 is a sectional elevation of a modified form of auxiliary valve. Fig. 17 is a sectional plan illustrating a modification in the construction of a working cylinder and piston. Fig. 18 is an elevation illustrating a further modified form of the invention. Fig. 19 is a transverse section of Fig. 18, and Fig. 20 is a transverse section of an arrangement similar to that illustrated in Figs. 18 and 19 applied to a steel or other metal guide or runner.

In the construction illustrated in Figs. 1 to 5 I show my invention applied to a mine cage and located on the top thereof. While I prefer to locate it on top of the cage as being ordinarily the most convenient and accessible, it is to be understood that it may if preferred be located beneath the cage, or when employed with cages constructed with a plurality of decks or superposed compartments it may be located in any suitable position between decks.

The cage, of which the frame comprising the several members 1 only are shown (the inclosing plates being removed) is connected through the medium of the main supporting chains 2 with the shackle 2ᵉ connected with the winding or hauling rope. Through these chains 2 the load of the cage is carried by the hauling rope 28.

3 is a pair of superpositioned horizontal channel irons or U girders. These girders 3 are riveted or otherwise fixed at their extremities—see Fig. 3—to the ordinary angle-iron shoes 4 which are fitted to the sides of the vehicle and slidingly engage the runners or guides 5 to guide the vehicle in its ascent and descent of the shaft. These U girders 3, on the inside, are connected for the greater portion of their length by the vertical strengthening plate 6, riveted or otherwise fixed thereto. Between the girders 3, and at or in proximity to their extremities, are arranged and supported the two working cylinders 7. The cylinders 7 are constructed with projections or lugs 8 which serve for riveting or otherwise securely fixing them to the girders 3.

9 are two horizontal and movable superpositioned girders located above the top of the cage and on the opposite side of the runners 5 to the stationary girders 3, connected at their extremities on the inside by means of plates 10. When the several parts are in their normal or inoperative position the distance between the fixed shoes 4 on the one side of the runners 5 and the movable brake plates 10 on the other side of the runners, slightly exceeds the width of the runners so that they run clear of the latter and offer no obstruction to the ascent and descent of the cage. The plates 10, which form the friction brake plates, are adapted to be moved (along with the girders 9) into contact with the sides of the runners 5, the shoes as shown at 11 in Fig. 3, being cut away to allow them to move inwards towards the runners.

The frictional brake plates 10, may, if desired, be roughened or serrated so as to increase the friction created between the surface of the plates and the runners 5 when they are brought into contact.

In the cylinders 7 are arranged pistons 12 and piston rods 13, which latter project through the cylinders 7 and through holes formed in the brake plates 10 and are connected to the movable girders 9 by means of washers 14, and the nuts 15 screwed on the extremities of the piston rods 13 beyond the washers 14. Each of the pistons 12 (see Fig. 3) comprises two disks carrying between them a cup leather or other suitable packing secured by means of a nut screwed on the extremity of the piston rod. 16 is another cup leather or similar packing and 17 a packing ring located inside the cylinder 7 round the piston rod 13 and fixed to the cylinder by means of the nuts and bolts 18. The packings for the piston 12 and piston rod 13 are to prevent the escape of the compressed gas when it is admitted between the cylinder and piston.

Located between the two fixed girders 3 is a cylindrical gas holder or container 19 which may conveniently be a steel tube tightly closed at its extremities. This cylinder or gas holder 19 is filled with liquid carbonic acid.

20 represents a strap or plate riveted or otherwise suitably fixed at the center between the two stationary girders 3, which serves as a retaining means for the gas holder 19.

Into one end of the gas holder 19 projects a tube 21 shown fitted with a valve 22 which may be utilized for shutting off the gas supply when it is desired to put the safety apparatus out of operation or to charge the gas holder or refill it. This valve 22 is open in the normal running of the vehicle so that the gas is always present in the tube 21. The tube 21, see Fig. 1, is fitted with a T piece 23 in one branch of which is fitted a pipe 24 connecting with the pressure gage 25 which serves for indicating the gas pressure. This pressure gage 25, may as shown, be conveniently located inside the cage so that the absence of the gas or any appreciable fall in the pressure would be immediately noticed by persons traveling in the vehicle.

From the T piece 23 a small branch pipe communicates with the inlet 26 of the main valve casing 27. The main valve is shown to an enlarged scale in connection with Figs. 4 and 5. In the construction shown in these figures it assumes the form of a piston valve.

28 represents the outlet in the valve casing. In Fig. 4 the compressed gas is confined within the casing in the annular space between the pistons. In Fig. 5 the valve is shown placing the inlet 26 in communication through the annular recess between the piston with the outlet 28, so that the gas is free to pass through the valve. The pipe 29 which is connected with the outlet 28 in the valve casing, connects with one branch of a cross or four way piece 30.

31, 32, are two pipes communicating with two other branches of the cross piece 30 and communicating with the two cylinders 7 on the inside of the pistons 12. The valve 27 is shown in Fig. 3 carried by means of a bracket 33 fixed to the plate 6 which serves for rigidly supporting the several tubular connections between the cylinders 7 and gas holder 19.

34 is a horizontally disposed plate formed in one piece with the wings or side plates 35 and flanges or projections 36 for bolting, riveting or otherwise securing it to the plate 6 and top stationary girder 3. The plate 34 on the underside is constructed with a cylindrical projection 37 which serves as a stationary plunger piston working within a movable cylinder 38. A cup leather packing is secured on the inner end of the piston 37 by means of a nut or cap 39. The cylinder 38 is constructed round its upper end with an external annular flange 40 and encircling the cylinder 38 is a suitable coiled king spring 41. Arranged beneath the cylinder 38 is a plate 42 between which and the cylinder flange 40 the coiled spring 41 is placed in compression when the weight of the vehicle is on the hauling rope. As seen in Fig. 3 the movable girders 9 carrying the brake plates 10 are suitably curved to clear the cylinder 38 and allow for movement of the girders to place the brake plates 10 in contact with the sides of the runners 5.

43 represents the drawbar which is bifurcated or looped and passes through holes in the plate 34 and is fixed to the plate 42. The drawbar 43 is connected by means of a rope or suitable chain with the shackle connecting the supporting chains 2 with the winding rope, or otherwise suitably connected to the chains 2 or winding rope, so that when the main supporting chains 2 are taut and carrying the weight of the cage the drawbar 43 has drawn up the plate 42 against the lower end of the movable cylinder 38 and placed the spring 41 in compression.

A pipe 44 from the fourth branch of the cross 30 passes through a hole in the center of the plate 34 through the hollow interior of the piston 37 and through a hole in the cap or nut 39 and communicates with the interior of the movable cylinder 38 below the piston 37.

On the underside of the plate 42 are provided two lugs or projections 45 between which is pivotally connected one end of a link 46. The other end of this link has pivotal connection with a lever 47, which latter at its other extremity is fulcrumed on a fixed pin or pivot 48 carried by the frame of the cage or otherwise.

49 is a link pivotally connecting the lower extremity of the main valve with the lever 47.

The action of the device constructed and arranged as above described will now be readily understood and may be described as follows:—In the drawings the several parts are shown in the positions they assume when the load is carried by the hauling rope. The drawbar 43 is then in its uppermost position, the plate 42 is engaging the underside of the movable cylinder 38 and placing the king spring 41 in compression. The extremity of the lever 47 which is connected by the link 46 to the plate 42, is drawn up, and the main valve, through link 49 is raised into the position in which it is shown in Fig. 4 and the gas supply shut off or confined to the gas holder 19 and the tube 21 intermediate of the gas holder 19 and valve casing 27. On the breaking of the rope the spring 41 forces the plate 42 down, which, through the link 46 moves the lever 47 downwards so that the latter through the link 49 draws the main valve down and places it in the position in which it is shown in Fig. 5. Immediately the main valve begins to open, the gas is free to pass to the cylinder 38 beneath the stationary piston 37 and so forces the cylinder 38 downwards on top of the spring 41, thereby helping to accelerate the downward movement of said plate 42, drawbar 43 and tail end of the hauling rope attached to the latter, so locking the main valve and preventing the tail end of the rope moving the valve back or into its closed position. Simultaneously the gas passes through the tubes 31, 32, to the working cylinders 7 and acting on the inner faces of the pistons 12 forces them outwards in the cylinders 7. The piston rods 13 and with them the girders 9 and brake plates 10 are moved by the pistons 12, which bring the brake plates 10 into contact with the sides of the runners 5 and apply the necessary brake pressure between the brake plates 10 and fixed guides 5 to retard and ultimately arrest the movement of the falling vehicle.

In Figs. 14 and 15 I illustrate the provision of an auxiliary disk or conical valve 50 working in conjunction with the main piston valve as a further security against leakages of the gas. 26ª represents the gas inlet into the valve casing 27ª and 51 the port between the auxiliary valve 50 and main valve. The valve casing 27ª is constructed to provide a seating for the conical valve 50, which latter is normally maintained on its seat by a spring 52. The plug 53 screwed into the casing serves as a guide for the valve stem. The other end of the valve stem passes through a plug 54 and has attached to its outer extremity a yoke or piece 55 to which latter are pivotally connected the two links 56. These links 56, as also the main piston valve, at their lower extremities, are pivotally connected through other links to the actuating lever 47 so that the main valve is first actuated and then the auxiliary valve.

In Fig. 16 I illustrate the employment of a slide valve 57 as the auxiliary valve in place of the disk or conical valve shown in Fig. 14. The auxiliary and main valves may be actuated as described in connection with Figs. 14 and 15.

In Figs. 6 to 9 I illustrate a modified form of the invention in which the cylinder 38 for accelerating the downward movement of the tail end of the rope, is dispensed with, and in which I provide other means for locking or securing the drawbar 43$^a$ and with it the tail end of the rope. In this arrangement, 3$^a$ are the stationary girders supporting the working cylinders 7$^a$; 12$^a$ the pistons and 13$^a$ the piston rods, which latter at their outer extremities carry the movable girders 9$^a$ to which are fixed the frictional brake plates 10$^a$ which are adapted to move in the slots 11$^a$ (see Figs. 7 and 8) cut in the shoes 4, to contact with the runners. The girders 9$^a$ are shown connected at their extremities by pieces of channel iron 58 between which the extremities of the piston rods 13$^a$ project, 59 being pins connecting the extremities of the piston rods 13$^a$ to said channel irons 58. 60 are two parallel vertical plates riveted to angle pieces 61, which latter are also riveted to the stationary girders 3$^a$. These plates 60 at their inner ends are bent inwards or towards each other and bolted together as at 62 (see Fig. 7) in order to stiffen them. The outer ends of the plates 60 are constructed with holes to form bearings for a horizontally disposed shaft 63. On this shaft 63 between the plates 60 is keyed or otherwise suitably fixed a lever 64, which latter at its other extremity is bifurcated. 43$^a$ is the drawbar which is constructed with an elongated slot 65. The drawbar 43$^a$ projects through the bifurcation in the lever 64 and a pin 66 which passes through the bifurcation and slot 65 connects the drawbar 43$^a$ with the lever 64. The drawbar 43$^a$ passes through a hole in a plate 67 fixed to one of the stationary girders 3$^a$. Beneath the plate 67 and surrounding the drawbar 43$^a$ is the king-spring 41$^a$ which latter is placed in compression between said plate 67 and another plate 68 fixed to the lower extremity of said drawbar 43$^a$. 46$^a$ are the links pivotally connected to the plate 68 and to the lever 47$^a$ which operate the main valve in the casing 27$^b$. The lever 47$^a$ is shown fulcrumed on a pin 48$^a$ carried by a channel iron 68' fixed to the stationary girders 3$^a$. The lever 47$^a$ at its other extremity is bifurcated so as to project round the king-spring 41$^a$ and to the bifurcated extremities are pivoted links 46$^a$. The ends of the shaft 63 project into the outer ends of the working cylinders 7$^a$ and are constructed with a recess between which and a recess in the end of the piston rod 13$^a$ is arranged a connecting piece or pin 69 so that when the pistons 12$^a$ are moved outwards in the cylinders 7$^a$ they rotate the shaft 63 in its bearings. 19$^a$ (see Figs. 7 and 9) is the gas holder or container shown fixed to the bottom stationary girder 3$^a$ by the cylinder or band 70. 22$^a$ is the valve for closing the gas supply to the working cylinders 7$^a$, 27$^b$ the main valve actuated by the lever 47$^a$ which serves for admitting the gas to the pipes 31$^a$, 32$^a$ communicating with the two working cylinders, and 25$^a$ is the pressure gage between the gas holder 19$^a$ and the main valve.

As shown, the brake mechanism is in its inoperative position. The drawbar 43$^a$ is raised, the king-spring 41$^a$ is in compression, the valve 27$^b$ closed and the brake plates 10$^a$ running clear of the sides of the runners 5. When the rope breaks the king-spring 41$^a$ depresses the drawbar 43$^a$ and plate 68; the latter actuates the lever 47$^a$ through links 46$^a$ and opens the valve 27$^b$, whereupon the gas is permitted to enter the working cylinders 7$^a$. This moves the pistons 12$^a$ in an outward direction in the cylinders 7$^a$, which movement, through the connecting piece or pin 69 rotates the shaft 63. The lever 64 which is fixed to the shaft 63 is moved in a downward direction causing the pin 66 to engage the bottom of the elongated slot 65 and accelerate the downward movement of the drawbar 43$^a$ and the tail end of the rope attached thereto and at the same time operates as a retaining means and prevents the drawbar 43$^a$ being again lifted and the valve 27$^b$ closed. When the winding rope is again drawn taut the lever 64 is raised and rotates the shaft 63, which through the connecting pieces or pins 69 moves the pistons 12$^a$ and piston rods 13$^a$ in an inward direction in the cylinders 7$^a$ and so places the brake plates 10$^a$ out of contact with the runners 5. The main piston valve 27$^b$, through the plate 68, links 46$^a$ and lever 47$^a$, is simultaneously closed, which closes the working cylinders 7$^a$ to the gas supply and opens them to the atmosphere as will be clearly understood on reference to the valve illustrated in Fig. 4.

In the modified arrangement illustrated in Figs. 10 and 11, 3$^b$ are the stationary girders above the upper one of which is located the gas holder 19$^b$ carried by the bracket or carrier 71. 72 is a plate riveted to said girders 3$^b$ and to the shoes 4$^b$. 43$^b$ is the drawbar which is surrounded by a fixed cylinder 73. In the upper end of the cylinder 73 is screwed or otherwise fixed a ring 74 through a hole in the center of which projects the drawbar 43$^b$. On the drawbar 43$^b$ is screwed or otherwise fixed a collar 75 which extends for a short distance into the lower end of the cylinder 73. Between this collar 75 and the ring 74 closing the upper end of the cylinder 73 is arranged the king-spring 41$^b$. The lower end of the drawbar 43$^b$ is formed with an elongated slot 76. Between the two stationary girders 3$^b$ are fixed two pieces of channel iron 77 which support a pin 78 on which is fulcrumed a pair of levers 79. These levers 79 at their other extremities engage a pin 80 which passes through the elongated slot 76 in the drawbar 43$^b$. 81 is another pair of levers or links which at one end engage the pin 80. At their other ends these levers or links 81 are pivotally connected to another link member 82 which latter at its other extremity is pivotally connected to a lug or bracket 83 formed upon or fixed to the cylinder 73. The link member 82 projects through a hole or slot formed in the top movable girder 9$^b$. The lower extremity of the drawbar 43$^b$ is connected through the medium of the links 84 with the lever 47$^b$ which serves for actuating the main valve and also the auxiliary valve when one is employed. The arrangement of tubes and valves for conducting the compressed gas to the working cylinders 7$^b$ may be the same as those previously described. This arrangement operates to accelerate the downward movement of the drawbar 43$^b$ and tail end of the rope when the safety gear comes into operation and to lock these parts so as to prevent their reclosing the main valve, in the following manner: The drawbar 43$^b$ having fallen and the compressed gas having been admitted as hereinbefore fully explained to the working cylinders 7$^b$, the movable girders 9$^b$ carrying the friction brake plates 10 are moved inwards. In moving inwards the movable girders 9$^b$ move the members 81, 82, inwards and so cause the pin 80 carried by the members 79, 81, to be lowered until it rests at the bottom of the elongated slot 76. So long as the gas pressure continues the several members remain in this position and so lock the drawbar 43$^b$. The parts are shown in the locked position in the drawings.

In the modified arrangement illustrated in Figs. 12 and 13, instead of making the working cylinder stationary and the working piston movable, and connecting it with the movable girders, the piston is made stationary and connected with the stationary girders and the cylinder, which is made movable is fixed to the movable girders. 3$^c$ are the stationary girders and 9$^c$ are the movable girders which are connected by means of the bolt 85 to one end of the movable cylinder 7$^c$, 86 being washers between the girders and bolt and nut 85. The cylinder 7$^c$ is constructed with two diametrically opposite longitudinal slots 87 which extend for the greater portion of its length. 12$^c$ is the piston which is constructed with two projections, trunnions or pins 88 which extend through the longitudinal slots 87 and engage holes provided in channel iron pieces 89 fixed between the stationary girders 3$^c$, thereby preventing movement of the piston 12$^c$. 90 is the pipe which conducts the compressed gas to the cylinder 7$^c$ behind the piston 12$^c$. This pipe 90 is shown passing through one of the pins or projections 88 and then extending through the piston 12$^c$ to the closed end of the cylinder 7$^c$ in front of the piston. 91 is a cup leather and 92 a nut screwed on the end of the piston 12$^c$ for retaining the leather 91 in position. When the gas is admitted to the cylinder 7$^c$, the piston 12$^c$ being stationary, the cylinder 7$^c$ is moved and carries with it the movable girders 9$^c$ to which the brake plates 10 are fixed.

In Fig. 17 I show a further modification in the arrangement of the working cylinder and piston. In the previously described constructions ordinary pistons, that is to say pistons on which the gas has acted directly, have been described. In Fig. 17 however the gas pressure is admitted into a distensible resilient pouch or bag 93 positioned between the cylinder 7$^d$ and piston 12$^d$. 90$'$ is the tube from the gas container and 94 a gland fixing it to the cylinder 7$^d$. This tube 90 communicates with the interior of the rubber or other suitable pouch 93 which is located in a recess formed between the piston 12$^d$ and cylinder 7$^d$. The piston 12$^d$ and cylinder 7$^d$ are shown made approximately hemi-spherical but they may be of any other suitable form. 13$^d$ is the piston rod attached to the piston. When the gas is admitted to the pouch 93 it will be understood that it moves the piston 12$^d$ and with it the piston rod 13$^d$ inside the cylinder 7$^d$ and so actuates the movable girders 9 and brake plates 10. This construction effectively prevents the escape of the gas from between the piston 12$^d$ and cylinder 7$^d$.

In Figs. 18 and 19 I illustrate the employment of a distensible pouch 95 in conjunction with a special form of guide or shoe. The guide comprises a plate 96 adapted to be fixed to the side of the vehicle, formed on the one side with a projection 97 for engaging one side of the runner 5$^b$—see Fig. 19. On the other side the guide is constructed to form a recess 98 for a brake member or block 99. Between the bottom of the recess 98 and the brake member 99 is positioned the distensible pouch 95. The brake member 99 is shown constructed with a plurality of elongated slots 100 engaged by a corresponding number of bolts 101 passing through the guide. 90$^a$ is the tube which serves for conveying the compressed gas to the pouch 95, and 94$^a$ the gland securing said tube to the guide. On the admission of the gas to the pouch 95 the pressure is transmitted to the inner face of the brake block 99 so that the latter is forced into contact with the side of the runner 5$^b$.

In Fig. 20 I illustrate the arrangement shown in Figs. 18 and 19 applied to a steel or metal runner 5$^a$. In this construction the distance between the projection 97 forming the shoe on the one side and the recess 98 on the other side, is reduced. In other respects the construction is the same as that described in connection with Figs. 18 and 19.

Instead of employing liquid carbonic acid I may employ any other suitable compressed gas; or the gas holder might have placed in it two substances which would be exploded by suitable means from the actuating spring 41, or other suitable part to generate a gas to move the pistons in the cylinders; for example, if the tube or gas holder 19 were filled or partially filled with a certain quantity of benzol, and the actuating spring used to create a spark inside the tube, then a compressed gas would be produced.

In order to ascertain if there is any of the liquid carbonic acid in the cylinder 19, the valve 22 on the end of the cylinder 19 may be closed and the union fitted thereon be disconnected. The cylinder 19 is pivotally or otherwise suitably supported a little above its center so that when the disconnection is made with the pipe the cylinder will incline or tilt to one end in the event of liquid acid being present, but if the cylinder contains no liquid it will remain horizontal.

What I claim as my invention and desire to protect by Letters Patent is:—

1. In apparatus of the nature specified, the combination with a vehicle its suspension gear and the hauling rope, of frictional brake mechanism, a vessel for holding gas under pressure, means placing the gas holder in communication with the frictional brake mechanism, and means for utilizing the gas pressure to accelerate the downward movement of the tail end of the rope in the event of breakage thereof.

2. In apparatus of the nature specified, the combination with a vehicle, its suspension gear and the hauling rope, of frictional brake mechanism, a container for gas under pressure, means for conveying the gas from said container to the brake mechanism, a valve in said conveying means, means for actuating said valve to admit the gas pressure to the frictional brake mechanism in the event of breakage of the hauling rope, and means for utilizing the gas pressure to accelerate the downward movement of the tail end of the rope and suspension gear, and to maintain the valve open to the brake mechanism.

3. In apparatus of the nature specified, the combination with a vehicle, its suspension gear and the hauling rope, of frictional brake mechanism, a container for gas under pressure, means for conveying the gas from said container to the brake mechanism, a main valve in said conveying means and an auxiliary valve between the main valve and container, and means for actuating said valves to admit the gas pressure to the frictional brake mechanism in the event of breakage of the hauling rope, and means for utilizing the gas pressure to accelerate the downward movement of the tail end of the rope and suspension gear and to maintain the valves open.

4. In apparatus of the nature specified, the combination with a vehicle, its suspension gear and the hauling rope, of frictional brake mechanism, a container for gas under pressure, means for conveying the gas from said container to the brake mechanism, a valve in said conveying means, means for actuating said valve to admit the gas pressure to the frictional brake mechanism in the event of breakage of the hauling rope, and means for utilizing the gas pressure to accelerate the downward movement of the tail end of the rope and suspension gear and to lock the valve in its open position to the brake mechanism, said latter means serving also to reclose the valve and to unlock the locking arrangement when the suspension gear is again placed in tension.

5. In apparatus of the nature specified, the combination with a vehicle, its suspension gear and the hauling rope, of frictional brake mechanism, a container for gas under pressure, means for conveying the gas from said container to the brake mechanism, a main valve in said conveying means and an auxiliary valve between the main valve and container, and means for actuating said valves to admit the gas pressure to the frictional brake mechanism in the event of breakage of the hauling rope, and means for utilizing the gas pressure to accelerate the downward movement of the tail end of the rope and suspension gear, and to lock the valves in their open position to the brake mechanism, said latter means serving also to reclose the valves and to unlock the locking arrangement when the suspension gear is again placed in tension.

6. In apparatus of the nature specified, in combination, a vehicle, suspension gear, a hauling rope, a working cylinder and piston, one movable and the other stationary, a brake piece fixed to the movable member, a receptacle for gas under pressure, a tubular connection placing said receptacle in communication with the space between the cylinder and piston, a valve in said tubular connection, means for actuating said valve from the suspension gear in the event of the vehicle becoming unsuspended, and means for utilizing the gas pressure to accelerate the downward movement of the tail end of the rope and suspension gear and to maintain the valve open.

7. In apparatus of the nature specified, in combination a vehicle, suspension gear, a hauling rope, a working cylinder and piston, one movable and the other stationary, a brake piece fixed to the movable member, a receptacle for gas under pressure, a tubular connection placing said receptacle in communication with the space between the cylinder and piston, a valve in said tubular connection, means for actuating said valve from the suspension gear in the event of the vehicle becoming unsuspended, and means for utilizing the gas pressure to accelerate the downward movement of the tail end of the rope and suspension gear and to lock the valve in its open position to the working cylinder, said means serving also to reclose the valve and to unlock the locking means when the suspension gear is again placed in tension.

8. In apparatus of the nature specified, in combination, a vehicle, suspension gear, a hauling rope, a pair of working cylinders and pistons movable therein, brake members carried and actuated by said pistons, a holder for gas under pressure, pipes placing said holder in communication with the two working cylinders, a valve in said pipes, means for actuating said valve from the suspension gear in the event of the vehicle becoming unsuspended, a further cylinder and piston also in communication with the gas holder through the valve aforesaid, said latter cylinder and piston serving for accelerating the downward movement of the tail end of the rope and suspension gear and for locking the valve in its open position to the working cylinders.

9. In apparatus of the nature specified, in combination, a vehicle, a pair of working cylinders, carried by the vehicle, pistons movable in said cylinders, brake members carried and actuated by said pistons, a holder for gas under pressure, carried by the vehicle, tubular connections between said holder and working cylinders, a stop valve and a main valve in said tubular connections, a hoisting rope, means connecting the vehicle to said rope, a drawbar connected with the rope or said means, a plate to which the drawbar is connected, a spring for moving said plate and drawbar in a downward direction on the breaking of the rope or suspension gear, a movable cylinder engaging the aforesaid plate and a stationary piston in said cylinder, tubular connection between the main valve and said latter cylinder and piston, and mechanism actuated by the aforesaid plate to open the main valve on the vehicle becoming unsuspended.

10. In apparatus of the nature specified, in combination, a vehicle, guide members therefor in the shaft, a pair of superpositioned girders disposed horizontally upon and fixed to the top of the vehicle, a pair of working cylinders carried by said girders at the sides of the vehicle, a pair of oppositely arranged superpositioned movable girders, brake plates connecting the extremities of said latter girders, said brake plates being adapted to contact with the sides of the members serving to guide the vehicle in its ascent and descent, a pair of pistons working within the aforesaid cylinders and carrying the aforesaid movable girders, a vessel for holding compressed gas, tubular connections between said vessel and the working cylinders, a stop valve and a main actuating valve in said tubular connections, a plate fixed above the top of the cage formed with a cylindrical piece or piston on the underside, a movable cylinder closed at its lower end and surrounding said piston, tubular connections between the main valve and said cylinder and piston, a spring surrounding said cylinder, a plate located beneath the cylinder in contact with the spring, a drawbar connected with said latter plate, a hauling rope, suspension gear connected to the hauling rope and to said drawbar which operates to place the spring in compression in the normal running of the vehicle, and a lever and links connecting the plate below the movable cylinder with the main valve.

11. In apparatus of the nature specified, in combination, a vehicle, runners therefor in the shaft, shoes fixed to the sides of the vehicle adapted to slidingly engage the shaft runners, a pair of superpositioned girders horizontally disposed upon the top of the vehicle and fixed to the shoes, a plate connecting said girders on the inside, a pair of open ended working cylinders carried at the sides of the vehicle by the girders, a pair of oppositely arranged superpositioned movable girders, brake plates connecting the extremities of said latter girders, said brake plates being movable in slots in the shoes towards and away from the sides of the runners, a pair of pistons working within the aforesaid cylinders, piston rods connected therewith, said rods carrying at their extremities the movable girders, airtight packings between the pistons and cylinders and piston rods and cylinders, a vessel for holding compressed gas carried by the stationary girders, a strap fixed to the girders for securing said gas holder in position, tubular connections between the gas holder and each of the working cylinders, a stop valve, a main valve, an auxiliary valve and a pressure gage in said tubular connections, a plate fixed to the stationary girders and formed with a cylindrical projection forming a hollow piston on the underside, a movable cylinder closed at its lower end and encircling the hollow piston, airtight packings between the piston and cylinder, tubular connections between the main valve and the cylinder and piston, a spring surrounding the movable cylinder and engaging the upper end thereof, a plate located beneath the cylinder in contact with the spring, a hauling rope, suspension gear connected with said latter plate which operates to place the spring in compression and raise the movable cylinder when the weight of the vehicle is on the suspension gear, a lever pivoted at one end to a fixed point of the vehicle, and links connecting said lever with the main and auxiliary valves and with the plate beneath the movable cylinder for opening the main valve to admit the gas pressure to the working cylinders and to the movable cylinder to actuate the brake mechanism and to accelerate the downward movement of the tail end of the rope and suspension bar in the event of the vehicle becoming unsuspended, substantially as described.

In witness whereof I have hereunto set my hand in the presence of two subscribing witnesses.

KURT WILHELM OTTO SCHWEDER.

Witnesses:
  CHAS. OVENDALE,
  R. OVENDALE.